Patented Dec. 22, 1931

1,837,328

UNITED STATES PATENT OFFICE

BEVERLY OBER AND EDWARD HYATT WIGHT, OF BALTIMORE, MARYLAND, ASSIGNORS, BY MESNE ASSIGNMENTS, TO THE OBERPHOS COMPANY, OF BALTIMORE, MARYLAND, A CORPORATION OF MARYLAND

PROCESS FOR MANUFACTURING FERTILIZER MIXTURES

No Drawing.    Application filed December 22, 1926.  Serial No. 156,514.

This invention relates to fertilizer materials and more particularly to plant foods containing more than one fertilizer ingredient, known as fertilizer bases.

In the past when it was desired to provide a fertilizer material having more than one fertilizer ingredient it was the general custom to incorporate the separately prepared components. This system necessitated many operations and involved a considerable expenditure of time.

It is an object of our invention to provide a process for manufacturing fertilizer bases which may be carried out in a minimum of apparatus.

Another object is to prepare a fertilizer base by subjecting various raw materials to contemporaneous processing.

Another object is to prepare, by the one process, a product having a plurality of fertilizer components.

To accomplish these and other important and related objects which will be apparent from the following description, we propose to treat phosphatic, nitrogenous and potash materials either singly or in combination with a strong mineral acid under properly regulated conditions of time, temperature and pressure to obtain the fertilizer base.

To exemplify the underlying principles of the invention, we will describe a process for producing a fertilizer base comprising phosphate and nitrogenous components. As will appear more fully hereinafter, the process is not restricted to the exclusive production of this product, for we may concurrently treat phosphate and a potash ingredient, or all three, that is to say, phosphate, nitrogen and potash materials may be concurrently processed.

To obtain this product, we propose to treat the several ingredients in an autoclave by acidulating the mass and regulating the subsequent reactions by proper control of reaction conditions within the container.

To carry out the process, phosphate rock, ground to the desired finess, is admitted to an autoclave, preferably of the horizontal rotary type. A nitrogen containing raw material which on digestion with acid can be rendered available for plant food is then added. The autoclave may be partially evacuated by operation of a vacuum pump in fluid communication therewith. A strong mineral acid, such as sulphuric or phosphoric may then be introduced to acidulate the mass of raw material within the autoclave. It will be appreciated that while we prefer to withdraw some air from the autoclave, the process is not restricted to that initial step. The acid, if desired, may be admitted to the autoclave which has not been subjected to a preliminary evacuation. It will also be appreciated that the preliminary mixing may be done in a separate container and the resulting sludge fed into the autoclave; however, mixing in the autoclave is the desirable method since it presents economies in both time and material. During the injection of the acid or after the calculated quantity of acid has been admitted, the mixture is thoroughly agitated by rotating the autoclave. As the reactions between the acid and raw materials progress gaseous products, such as carbon dioxide and hydrogen fluoride, are evolved. A pressure is thereby imposed on the material within the container. To prevent the generation of excessive pressures, the autoclave is provided with a relief valve. By adjustment of the valve, any desired degree of pressure may be maintained in the digestor. By allowing the reactions to take place in an airtight container, we are enabled to prevent escape of the components of the reacting materials and in a large measure to regulate the speed of reaction.

The rotation of the autoclave is continued for a time sufficient to allow complete digestion of the raw materials. This, of course, will vary over relatively wide ranges, depending on such factors as acid concentrations and characters of raw materials. Throughout the digestion period the autoclave is continuously rotated. This method of treatment insures a thorough incorporation of the acid with the several raw materials and thereby insures a maximum reaction surface for a given state of subdivision.

The reaction taking place within the autoclave may be accelerated by the application of heat. This may be done in various ways. The container may be exteriorly heated by means of gas burners or any other commercial heating apparatus. We prefer, however, to use steam. To effectually utilize this heating medium the autoclave is provided with an interior shell and a spaced exterior casing. Superheated steam is circulated through this space to thereby raise the temperature of the mass within the interior shell to any desired degree.

After the mass has been thoroughly digested, it is allowed to cool. It is desirable that the temperature be reduced to a point below that at which he nitrogen compound will decompose. We find that we can continue further processing within the autoclave. To crystallize the acid phosphate in situ, we release the pressure in the container. This may be very easily done by opening the relief valve. The release of pressure is accompanied by a drop in temperature which aids in initiating crystallization. By admitting a cooling medium, such as a brine solution, to the hollow shell, the temperature of the reaction products may be additionally lowered, with a consequent increase in crystallization. After the mass has been crystallized in the manner described, it is then dried. This step may be carried out in the same apparatus that was used for the digestion and crystallization stages.

To carry out this drying step the vacuum pump is operated. This pump withdraws moist vapors from the air space in the container and also any vapors occluded in the product. It will be seen that this vacuum treatment in addition to withdrawing moisture from the container, causes a second drop in temperature which aids further in crystallizing the mass.

If desired, the autoclave may be subjected to a gentle heat and continuously rotated during this drying stage. The application of heat tends to drive off residual moisture in the product. During this stage the vaporized material is continuously drawn off by the vacuum pump.

In the described process we use as our phosphatic material insoluble phosphate rock. For our nitrogenous raw material we may use any waste inert nitrogen compounds, such as leather scrap, hair, wool, feathers, fish scrap, fur, garbage, ammonium sulphate, etc. In utilizing these various nitrogen raw products, it may be desirable to reduce their water content before mixing with the phosphatic material. This may be done by preheating the damp nitrogenous material in the autoclave. This material may be admitted to the container and subjected to sufficient heat to drive off excess water which is then removed through the vacuum line.

It will now be seen that we have devised a process and apparatus for treating a plurality of materials having potential fertilizer values to obtain a product which has several agriculturally available fertilizer ingredients. The separate stages of preliminary drying, mixing, digesting, crystallizing, and final drying may be carried out in a single container so that the apparatus cost is cut to a minimum. The process is simple and requires, as has been pointed out, a minimum of apparatus to effectuate it. The product obtained is of very low moisture content of a desirable mechanical structure so that subsequent grinding is rendered easy. The thorough drying treatment gives a product which is easily bagged and which has no deleterious effects upon the sacks.

We claim:

1. A process of manufacturing fertilizers comprising mixing predetermined quantities of finely ground phosphate, a material having a potential fertilizer value and sulphuric acid in a confined space, digesting the mixture while mechanically agitating under superatmospheric pressure and applied superatmospheric temperature, continuing the digestion for a period of time such that substantially no free acid is contained in the product, and then releasing the pressure and drying and crystallizing the product within the confined space.

2. A process of manufacturing fertilizers comprising mixing predetermined quantities of finely divided phosphate rock and another material having a potential fertilizer value and sulphuric acid in a confined space, digesting the mass while mechanically agitating under autogenous superatmospheric pressures and maintaining the mass at elevated temperatures during the digestion by applying extraneous heat, continuing the digestion for a period of time sufficient to effect a substantial conversion of the unavailable phosphate and the material having a potential fertilizer value into available fertilizers, and then releasing the pressure and drying the product within the confined space.

3. A process for preparing fertilizers comprising passing potentially agriculturally available nitrogenous material to a confined space, setting up a vacuum therein to withdraw moisture, admitting a phosphatic material to the confined space, acidulating and digesting the mass within the space under super-atmospheric pressure and temperature, mechanically agitating the mass, retaining it in the space for a period of time sufficient to effect substantial conversion of the unavailable phosphate and the potentially agriculturally available nitrogenous material into fertilizer in available forms, and then crystallizing and drying the solid products of conversion within the confined space.

4. A process for preparing a fertilizer material comprising passing a potentially agriculturally available nitrogenous material into a container, setting up a vacuum therein to withdraw moisture, admitting a phosphatic material to the container, acidulating and digesting the mass in the autoclave at elevated temperatures and pressures.

In testimony whereof we affix our signatures.

BEVERLY OBER.
EDWARD HYATT WIGHT.